(12) United States Patent
Liardet et al.

(10) Patent No.: US 9,020,148 B2
(45) Date of Patent: Apr. 28, 2015

(54) PROTECTION OF REGISTERS AGAINST UNILATERAL DISTURBANCES

(75) Inventors: Pierre-Yvan Liardet, Peynier (FR); Yannick Teglia, Belcodene (FR); Jérôme Tournemille, Pourrieres (FR)

(73) Assignee: STMicroelectronics (Rousset) SAS, Rousset (FR)

( * ) Notice: Subject to any disclaimer, the term of this patent is extended or adjusted under 35 U.S.C. 154(b) by 42 days.

(21) Appl. No.: 13/030,317

(22) Filed: Feb. 18, 2011

(65) Prior Publication Data

US 2011/0222684 A1    Sep. 15, 2011

(30) Foreign Application Priority Data

Feb. 19, 2010  (FR) ...................... 10 51205

(51) Int. Cl.
*H04L 9/28* (2006.01)
*G06F 21/75* (2013.01)
*G06F 21/72* (2013.01)
*H04L 9/00* (2006.01)

(52) U.S. Cl.
CPC ............... *G06F 21/75* (2013.01); *G06F 21/72* (2013.01); *G06F 2221/2105* (2013.01); *H04L 9/004* (2013.01)

(58) Field of Classification Search
CPC ............. G06F 7/725; H04L 9/06; H04L 9/00; H04L 9/30
USPC ...................................................... 380/28, 277
See application file for complete search history.

(56) References Cited

U.S. PATENT DOCUMENTS 7,970,128 B2 *   6/2011   Torla ........................... 380/28
2008/0056488 A1 *   3/2008   Motoyama .................. 380/29
2009/0285398 A1 *  11/2009   Liardet et al. ............... 380/277

FOREIGN PATENT DOCUMENTS

WO    WO 2005124506 A2    12/2005
WO    WO 2008124506       * 12/2005

OTHER PUBLICATIONS

French Search Report dated Sep. 29, 2010 from corresponding French Application No. 10/51205.

\* cited by examiner

*Primary Examiner* — Vivek Srivastava
*Assistant Examiner* — Sibte Bukhari
(74) *Attorney, Agent, or Firm* — Seed IP Law Group PLLC

(57) ABSTRACT

A method for protecting a key intended to be used by an electronic circuit in an encryption or decryption algorithm, including the steps of: submitting the key to a first function taking a selection value into account; storing all or part of the result of this function in at least two registers; when the key is called by the algorithm, reading the contents of said registers and submitting them to a second function taking into account all or part of the bits of the registers; and providing the result of the combination as an input for the algorithm, the second function being such that the provided result corresponds to the key.

32 Claims, 3 Drawing Sheets

PROTECTION OF REGISTERS AGAINST UNILATERAL DISTURBANCES

CROSS REFERENCE TO RELATED APPLICATIONS

This application claims the priority benefit of French patent application number 10/51205, filed on Feb. 19, 2010, entitled "PROTECTION OF REGISTERS AGAINST UNILATERAL DISTURBANCES," which is hereby incorporated by reference to the maximum extent allowable by law.

BACKGROUND OF THE INVENTION

1. Field of the Invention

The present invention generally relates to electronic circuits and, more specifically, to data processing units implementing encryption or decryption algorithms. The present invention more specifically relates to mechanisms for protecting the content of registers against unidirectional disturbances of bits that it contains.

2. Discussion of the Related Art

When a processing unit (typically, a cryptoprocessor) is used to implement an encryption algorithm, it is desired to check that the manipulated key has not been modified (incidentally or willfully), either during its transfer to the cryptoprocessor from an external circuit, or once in this cryptoprocessor while it is contained in a specific register thereof. Attacks aiming at disturbing the state of a bit of a register of the cryptoprocessor generally are attacks using a laser pointed on one of the bits of the register containing the key to disturb its value.

To counter a modification during the transfer, a solution is to reload the key in the cryptoprocessor as often as possible, generally on each new encryption, or periodically. However, the key register of the cryptoprocessor remains sensitive to laser attacks.

To check the integrity of the key once it is in the cryptoprocessor, the simplest would be to read this key to control it outside of the cryptoprocessor. However, to protect the key against possible hacking attempts, the temporary storage element (register) which contains the key is generally only accessible in read mode from outside of the cryptoprocessor. The integrity check then amounts to checking the consistency of results obtained by two separate calculations using the key contained in the cryptoprocessor. These two calculations are either two encryptions of a same message with the key, or a encryption followed by a decryption.

It has already been provided to check the consistency between two executions of the same algorithm, respectively with the key and with the key complemented to one. Such a solution is described in document USA-2009/0285398.

A difficulty lies in the fact that the results of an integrity check mechanism may provide information to the attacker as to the value of the bits of the key. For example, it is assumed that a successful attack causes a switching of a bit to state 1. If the attacked bit is at state 0, it will switch values. If the attacked bit is at state 1, its value remains unchanged. In this latter case, the checking mechanism is unable to notice the attack. Now, the attacker knows that he has attacked the corresponding bit. According to whether an attack detection bit switches state or not, the attacker can thus know whether the attacked bit was in a state 0 or 1. In other words, if one of the bits of the key is modified and the old and new values of this bit are the same, the checking mechanism is unable to notice it, be the checking direct (by rereading) or indirect (by two distinct calculations). This makes the key vulnerable to an attack or disturbance known as a unidirectional disturbance, which comprises forcing a bit of the key to a single one of the possible values. For example, the attacked bit is forced to zero whatever its initial state (1 or 0). The forcing of a bit to a single one of the two states may enable an attacker to determine the value of this bit according to whether his attack is or not detected (if it is not detected, then the actual bit of the key has the forced value—if it is detected, the actual bit of the key has the other state). By repeating this attack on each bit of the key, the value of said key can be obtained.

Further, a unidirectional attack may be performed simultaneously on several bits of a register, for example by using several laser beams directed towards several cells of the register.

It should be noted that the laser beam attack targets registers used in the calculations. The countermeasures are thus relative to the registers used for these calculations which, according to the algorithm using this register, may contain only a portion of the message and/or of the key.

An additional issue is to provide a countermeasure or protection mechanism which is simple to implement and which requires no modification of the hardware structure of the cryptoprocessor.

US 2008/0056488 discloses a cryptographic module with two registers respectively retaining a first data related to key data and a second data without dependency on the first data.

WO 2005/124506 discloses a cryptographic architecture with masking instructions against DPA attacks and provides toggling the polarity of some bits while maintaining the equal probability of having a 0 or 1 values.

SUMMARY OF THE INVENTION

It would be desirable to have a mechanism of protection of the content of a register which overcomes all or part of the disadvantages of usual integrity check or protection mechanisms.

It would also be desirable to provide a mechanism capable of detecting unidirectional disturbances of one or several bits of the register.

To achieve all or part of these and other objects, an embodiment of the present invention provides a method for protecting a key intended to be used by an electronic circuit in an encryption or decryption algorithm, comprising the steps of:

submitting the key to a first function taking a selection value into account;

storing all or part of the result of this function in at least two registers having the same size as the key;

when the key is called by the algorithm, reading the contents of said registers and submitting them to a second function taking into account all or part of the bits of the registers; and providing the result of the combination as an input for the algorithm, the second function being such that the provided result corresponds to the key.

According to an embodiment of the present invention, said second function also takes said selection value into account.

According to an embodiment of the present invention, the result of the second function is not stored in a register before being submitted to the algorithm.

According to an embodiment of the present invention, said selection value is a selection bit applied to each bit of the key.

According to an embodiment of the present invention, said selection value is a non-deterministically selected bit word.

According to an embodiment of the present invention, the first and second functions are logic combinations.

According to an embodiment of the present invention, the first function spreads the bits of the key or their ones' complements into two registers.

According to an embodiment of the present invention, the first function is a function spreading the bits of the key.

The present invention also provides an electronic circuit capable of implementing this method.

The foregoing objects, features, and advantages of the present invention will be discussed in detail in the following non-limiting description of specific embodiments in connection with the accompanying drawings.

DETAILED DESCRIPTION

Figure 1:
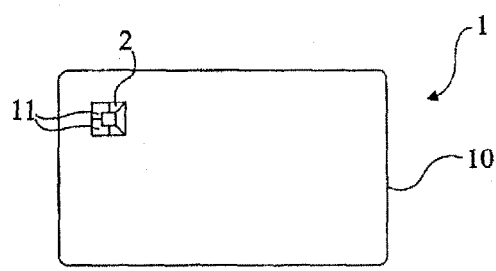
FIG. 1 is a simplified view of a chip card of the type to which the present invention applies as an example.

The same elements have been designated with the same reference numerals in the different drawings. For clarity, only those steps and elements which are useful to the understanding of the present invention have been shown and will be described. In particular, what use is made of the data to be encrypted or of the encrypted data has not been detailed, the present invention being compatible with any use. Further, the elements of the cryptographic processing unit or of the other circuits have not been detailed, the present invention being here again compatible with usual structures. Further, the encryption algorithm exploiting the key has not been detailed, the described embodiments being, as will be seen hereafter, compatible with any usual algorithm.

Reference will be made hereafter to term "encryption" to designate, unless otherwise mentioned, an encryption and/or a decryption, which are similar mechanisms (application of an algorithm to data and one or several keys). Similarly, reference will be made hereafter to term "register" to designate a temporary bit storage element based on one or several flip-flops. Further, the present invention will be described hereafter in relation with an example applied to an encryption or a decryption but it should be noted that it more generally applies as soon as a quantity considered as secret loaded in a register is manipulated to influence the circuit behavior in a way that can be observed from the outside, for example, by a signature checking mechanism.

FIG. 1 is a simplified representation of a chip card 1 of the type to which the embodiments which will be described apply as an example. Such a card 1 is formed of a support 10, for example, made of plastic matter, which supports or comprises one or several integrated circuits 2. Circuit(s) 2 are capable of communicating with the outside of the card (for example, with a read or read-write terminal) by means of contacts 11 or by contactless transceiver elements (not shown) such as an electromagnetic transponder. Circuits 2 comprise at least one encryption unit (generally called cryptoprocessor) capable of executing encryption and/or decryption calculations based on one or several keys loaded in the processing unit.

The use of encryption algorithms has many applications in electronics, be it for chip card systems, toll television systems, ciphered communication systems, etc. In all cases, there is an algorithmic processing unit capable of implementing encryption and/or decryption mechanisms.

Figure 2:
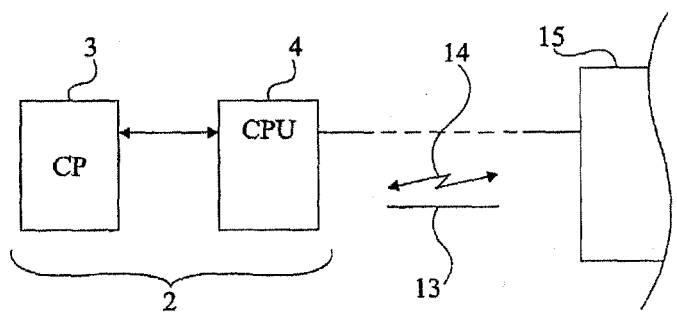
FIG. 2 is a block diagram of a system using a cryptoprocessor-type encryption/decryption unit.

FIG. 2 is a block diagram of a system using a cryptoprocessor 3 (CP). This cryptoprocessor is an integrated circuit considered as tamper-proof, which implements one or several encryption or decryption algorithms applied to data that it receives from the outside, by using one or several keys that it contains or that it also receives from the outside. Cryptoprocessor 3 is, for example, capable of communicating with a processing unit 4 (for example, a central processing unit CPU) of a circuit 2 integrating both elements 3 and 4 (and generally other circuits, not shown), such as volatile or non-volatile memories, an input-output interface, etc.).

Circuit 2 is capable of communicating over a wire link 13 or over a wireless link 14 with a separate device 15, for example, a circuit for exploiting the encrypted or decrypted data.

Figure 3:
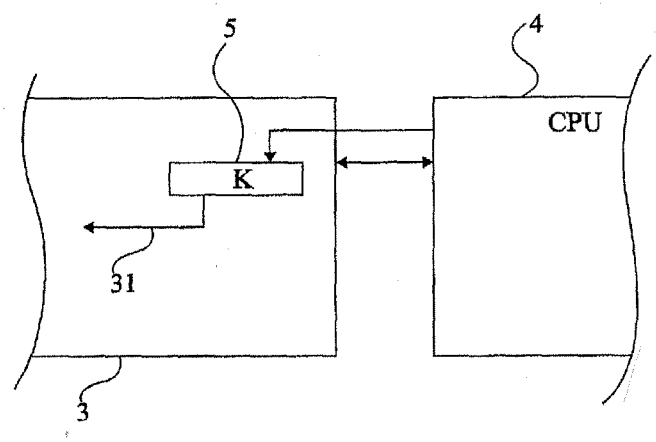
FIG. 3 is a partial block diagram of a circuit integrating an encryption/decryption unit and a central processing unit.

FIG. 3 is a detail of the diagram of FIG. 2 showing, in circuit 3, an internal temporary storage element 5 (a register). Of course, unit 3 generally comprises several registers for temporarily storing the encrypted data, the data to be encrypted as well as other variables and other elements enabling it to execute the encryption algorithm (wired logic, memories, software instruction processing unit, etc.). A specific register intended to contain encryption key K before it is used by the encryption algorithm is here considered. This register 5 will here be designated as a key register. Unit 3 may contain several key registers. The content of register 5 is, for example, written by unit 4 by transferring a key from the outside or from a non-volatile memory of the circuit. The content of register 5 is read by cryptoprocessor 3 (link 31) each time it needs the key for an encryption or decryption operation.

Figure 4:
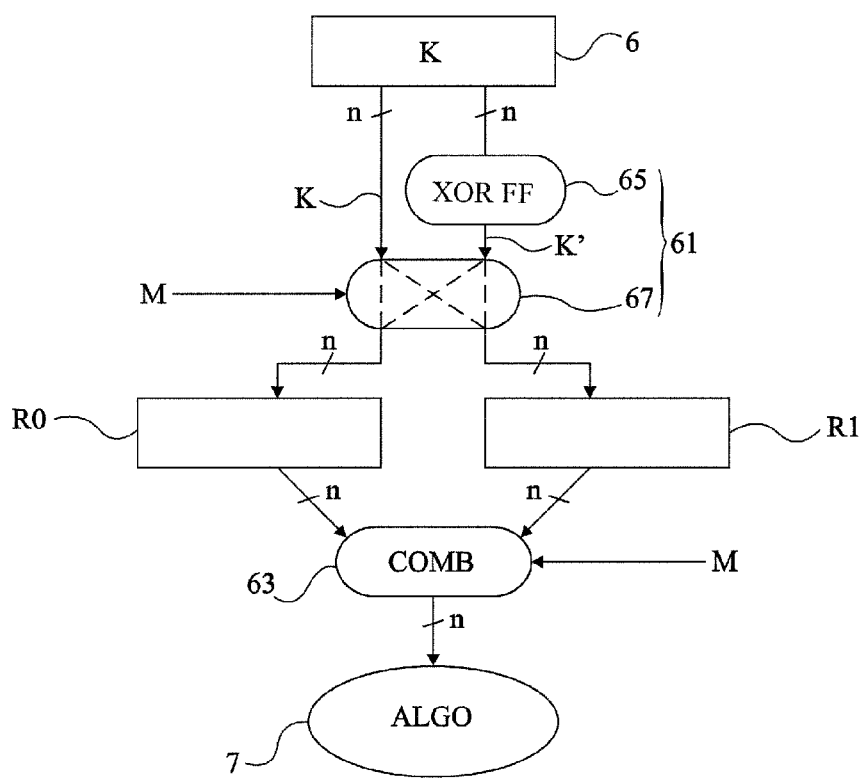
FIG. 4 illustrates, in the form of a block diagram, an embodiment of the protection method according to the present invention.

FIG. 4 is a block diagram of an embodiment of the present invention.

Key K, or a representation thereof, or more generally the secret quantity which is desired to be protected, is assumed to be contained in a storage element 6 internal or external to the circuit. The key is submitted to a ones' complement calculation 65 (XOR FF). Then, each bit of key K and of its ones' complement K' is, in non-deterministic fashion (for example, according to state 0 or 1 of a randomly selected selection bit M), directed (block 67) towards one or the other of two registers R0 and R1. Registers R0 and R1 correspond, for example, to portions of a same register 5 (FIG. 3) or to different registers, provided for the total size to correspond to at least twice that of the key. In the case of a total size greater than twice the size of the key, an indicator of the beginning of a useful area, for example randomly selected from a larger area, may be used.

Function 61 implemented by blocks 65 and 67 may be replaced with logic combinations having their results stored in registers R0 and R1. For example, register R0 contains the result of the inverse (ones' complement) of an XOR type combination of key K and of selection bit M (R0=NXOR(K, M)) and register R1 contains the result of an XOR-type combination of key K and of selection bit M (R1=XOR(K,M)).

Once this preparatory work has been performed, the contents of registers R0 and R1 are capable of being used when the circuit needs to implement an encryption algorithm (block 7, ALGO) exploiting key K.

Each time the algorithm needs the key, a control circuit comprised in the cryptoprocessor or in the processing unit (not shown) triggers the reading of registers R0 and R1 and submits their content to a logic function 63 (COMB) taking into account, for each bit, the respective contents of registers R0 and R1 and the value of selection bit M. Thus, according to state 0 or 1 of the bit used for routing 67 to registers R0 and R1, the result of the combination provides the value of key K to algorithm 7.

In the example of FIG. 4, function 63 is a logic combination function 63 having the following result R:

R=(M' OR R0) AND (M OR R1), where M' is the inverse state (its 1s' complement) of the selection bit.

The length (number n of bits) of selection value M is, in this example, equal to 1. Each bit of registers R0 and R1 is combined with selection bit M to generate output value R.

Selection bit M is preferably provided by a random selection at each reading of the key from element 6. Selection bit M is stored in a register (not shown in FIG. 4) to enable the proper execution of function 63. Ones' complement M' of selection bit M is calculated on the fly or is also stored.

Preferably, function 63 is applied in parallel to all the key bits.

It should be noted that Boolean function 63 uses all the bits of registers R0 and R1 to generate output R. Thus, a modification of one of the bits will have a direct effect on the output of the function, unlike a multiplexer which lets through either an input A, or an input B.

It should be noted that the value of the key provided by combination block 63 is no longer stored in a register but is directly sent onto the circuit logic. Accordingly, the absence of any storage from the moment that the key is plain (unmasked) avoids attack risks.

Figure 5:
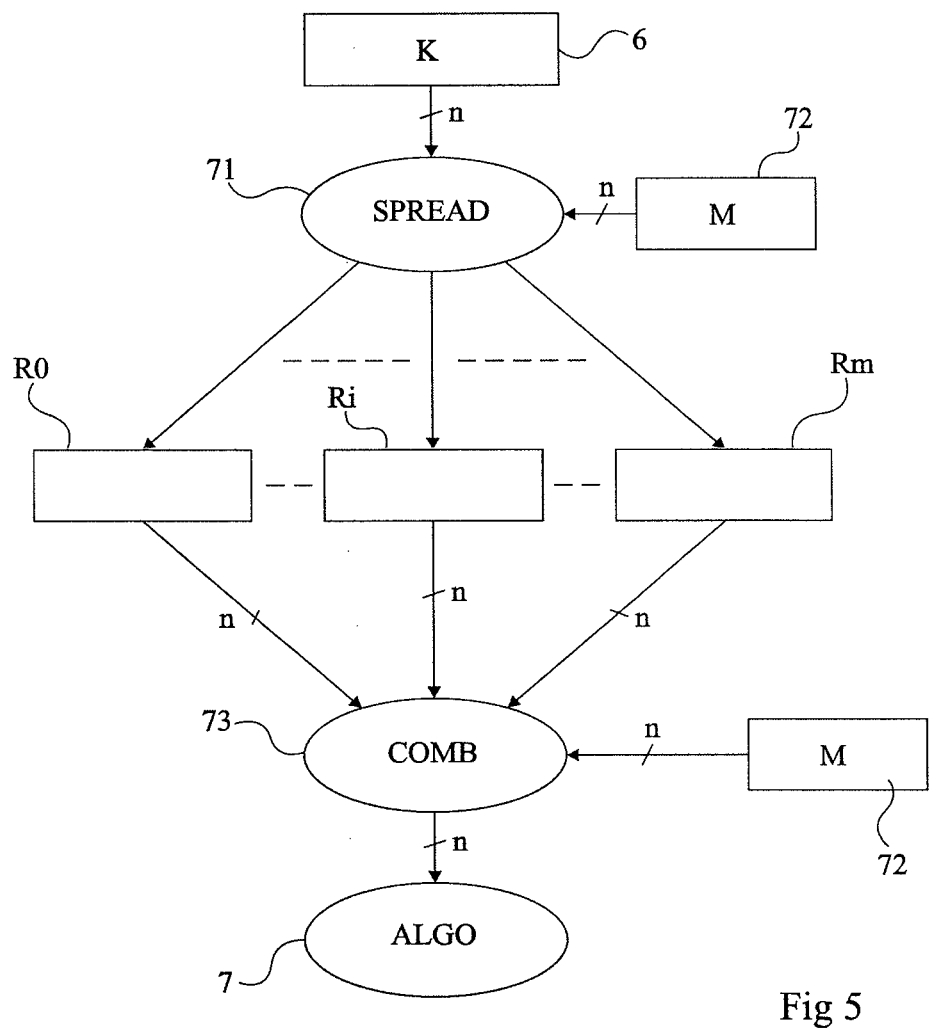
FIG. 5 is a block diagram illustrating another embodiment of the present invention.

FIG. 5 is a block diagram of another embodiment. According to this embodiment, key K coming from storage element 6 (or any value derived from the key) is spread (block 71, SPREAD) into several registers R0, . . . , Ri, . . . , Rm according to a selection value M contained, for example, in another register 72. Registers R0 to Rm may each contain the entire key K in a different form or a portion of the key. In this latter case, the portions may have different or identical sizes, the sum of the sizes of the sub-portions being at least equal to the size of the initial key.

Then, as in the previous embodiment, when algorithm 7 calls the key, said key is obtained by submitting the respective contents of registers R0 to Rm to a function 73 (COMB) parameterized from selection value M contained in register 72. Function 73 depends on the used spreading function 71.

For example, function 71 is a data spreading operation, that is, an operation of distribution of the key by pieces, preferably bit by bit, into the different registers. The selection of the register R0 to Rm containing the different key portions is performed according to selection value M. Combination function 73 then amounts to concatenating the different portions in an order depending on the selection value.

According to another example, function 71 represents a spreading of the key bits into the different registers R0 to Rm which have the same size as the key, the other bits of registers R0 to Rm containing state 0 (for example, the state of the bits of selection value M conditions, during spreading 71 the displacement of a pointer circularly selecting the register Ri in which the corresponding bit of the key is selected). Function 73 then represents an OR-type bit-to-bit combination of all registers R0 to Rm. In this embodiment, selection value M does not need to be stored for recombination function 73.

According to still another example, function 71 represents a logic function on the key and the selection value. For example, the key may be represented in different formats based on a so-called NRZI (Non Return to Zero Inverted) coding. This coding amounts to calculating an XOR between two successive bits (of rank i and i+1, with i ranging between 1 and n) of the key and to replacing the bit of rank i with the inverse of the result of the XOR operation. Assuming three registers Ri (m=2):

register R0 may contain the key in so-called MSBR format by the coding of two consecutive equal bits with value 0 and two consecutive unequal bits with value 1 (XOR function);

register R1 may contain the key coded in NRZI format (two consecutive equal bits with value 1 and two consecutive unequal bits with value 0); and register R2 may perform a bit permutation before starting an MSBR coding.

Function 73 then restores the key bits spread in the registers.

According to still another example, function 71 represents a base change of the key which is zeroed by function 73 once it has been read.

As in the previous example, the key obtained by recombination step 73 is no longer stored, but directly provided to the logic functions used by the algorithm.

If all or part of registers Ri have sizes greater than the key length, it may be necessary to take into account an indicator of the beginning of the portion containing the useful data of the concerned register(s). According to another variation, the bits of some registers are redundant and should then not be taken into account.

An advantage of the described embodiments is that an attacker does not know where to find the correct expression of the key. Accordingly, when an attacker targets an attack by unidirectional disturbance of one or several bits of one of the registers, the fault detection likely to provide him with information will indicate a fault which does not only depend on the value of the key, but also on function 61 or 71 applied to the key and on the selection value. The representation of the logic value of the key bit is modified, as well as its location in space, which makes the fault detection impossible to exploit by the attacker.

Another advantage is that the plain key does not remain present in a complete state in any register of the cryptoprocessor.

The fact for the key to be restored before its use by the algorithm makes the described embodiments applicable to any encryption algorithm, be it symmetrical or not. The selected embodiment replaces the key register in hardware or software fashion.

The provided protection mechanisms are compatible with usual processor structures and require no modification thereof. In particular, it is always possible to choose between a parallel or series checking and to share the calculation cell.

The efficiency of such a protection mechanism can be observed by modifying, after the loading of the key into the cryptoprocessor or on each loading of this key, two bits of one of the registers. If the mechanism has been implemented, the key obtained by the attack is not the right one. If it has not, the unidirectional attack on two or several bits provides the right key.

Specific embodiments of the present invention have been described. Various alterations and modifications will occur to those skilled in the art. In particular, the selection of the distribution and combination functions depends on the application and on the calculating capacity of the cryptoprocessor. Further, the practical implementation is within the abilities of those skilled in the art based on the functional indications provided hereabove, be it for a hardware or software implementation.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A method for protecting a key to be used by an electronic circuit in an algorithm, comprising acts of:
submitting the key to a first function taking a selection value into account;
storing at least one portion of a first result of applying the first function to the key in at least two registers each having a same size as the key, wherein the at least one portion of the first result comprises more bits than the key;
when the algorithm issues a call for the key, reading contents of said registers and submitting the contents to a second function, wherein the second function is a combination function that corresponds to the first function, such that a second result of applying the second function to the contents of the registers corresponds to the key submitted to the first function; and
using the second result of applying the second function to the contents of the registers to provide a response to the algorithm's call for the key, wherein the second function takes into account all or part of the contents of the registers.

2. The method of claim 1, wherein said second function also takes said selection value into account.

3. The method of claim 1, wherein the second result is provided to the algorithm but is not stored in a register before being submitted to the algorithm.

4. The method of claim 1, wherein said selection value is a selection bit applied to each bit of the key.

5. The method of claim 1, wherein said selection value is a non-deterministically selected bit word.

6. The method of claim 1, wherein the first and second functions are logic combinations.

7. The method of claim 1, wherein the first function spreads at least some bits of the key or their ones' complements into two registers.

8. The method of claim 1, wherein the first function is a function spreading at least some bits of the key.

9. A method for use in a circuit, the method comprising acts of:
receiving at least one input quantity to be stored for subsequent retrieval;
applying a first function to at least one input quantity to generate a first plurality of intermediate quantities, the first function taking into account at least one selection value;
storing the first plurality of intermediate quantities in at least one register, wherein the first plurality of intermediate quantities collectively comprises more bits than the at least one input quantity;
in response to a request to retrieve the at least one input quantity, reading a second plurality of intermediate quantities from the at least one register in which the first plurality of intermediate quantities was stored;
applying a second function to the second plurality of intermediate quantities to generate at least one output quantity, wherein the second function is a combination function that corresponds to the first function, such that the at least one output quantity generated by applying the second function to the second plurality of intermediate quantities corresponds to the at least one input quantity; and
using the at least one output quantity to provide a response to the request to retrieve the at least one input quantity.

10. The method of claim 9, further comprising an act of:
using the at least one output quantity as a key in an algorithm, the algorithm being an encryption or decryption algorithm.

11. The method of claim 10, wherein the at least one output quantity is directly sent to circuit logic implementing the algorithm without being stored in a register.

12. The method of claim 9, wherein each intermediate quantity in the first plurality of intermediate quantities is of a same size as the at least one input quantity.

13. The method of claim 9, wherein the second function also takes into account the at least one selection value.

14. The method of claim 9, wherein the at least one register comprises a first register and a second register and the at least one selection value comprises a selection bit, and wherein the first function determines whether the at least one input quantity is to be stored in the first register or the second register depending on the selection bit.

15. The method of claim 14, wherein the first function determines, depending on the selection bit, whether:
the at least one input quantity is to be stored in the first register and the ones' complement of the at least one input quantity is to be stored in the second register; or
the at least one input quantity is to be stored in the second register and the ones' complement of the at least one input quantity is to be stored in the first register.

16. The method of claim 9, wherein the first and second functions are such that, if the second plurality of intermediate quantities is the same as the first plurality of intermediate quantities, the at least one output quantity is the same as the at least one input quantity.

17. The method of claim 1, wherein the algorithm is an encryption or decryption algorithm.

18. A device, comprising:
a plurality of registers each having a same size as a key; and
combinational logic, which, in operation:
applies a first function to the key, the first function taking a selection value into account;
stores at least one portion of a result of applying the first function to the key in the plurality of registers, wherein the at least one portion of the first result comprises more bits than the key; and
in response to a call for the key:
reads contents of the plurality of registers;
applies a second function to the contents read from the plurality of registers, wherein the second function is a combination function that corresponds to the first function, such that a result of applying the second function to the contents read from the plurality of registers corresponds to the key submitted to the first function; and
outputs the result of applying the second function to the contents read from the plurality of registers, wherein the second function takes into account all or part of the contents of the plurality of registers.

19. The device of claim 18 wherein said second function takes said selection value into account.

20. The device of claim 18 wherein the second result is not stored in a register before being output by the combinational logic circuitry.

21. The device of claim 18 wherein said selection value is a selection bit applied to each bit of the key by the combinational logic circuitry.

22. The device of claim 18 wherein said selection value is a non-deterministically selected bit word.

23. The device of claim 18 wherein the first and second functions are logic combinations.

24. The device of claim 1 wherein the first function spreads at least some bits of the key or their ones' complements into the plurality of registers.

25. A system, comprising:
a plurality of registers; and
wired logic, which, in operation,
 applies a first function to at least one input quantity to generate a first plurality of intermediate quantities, the first function taking into account at least one selection value;
 stores the first plurality of intermediate quantities in at least one register of the plurality of registers, wherein the first plurality of intermediate quantities collectively comprises more bits than the at least one input quantity; and
 in response to a request to retrieve the at least one input quantity,
  reads a second plurality of intermediate quantities from the at least one register in which the first plurality of intermediate quantities was stored;
  applies a second function to the second plurality of intermediate quantities to generate at least one output quantity, wherein the second function is a combination function that corresponds to the first function, such that the at least one output quantity generated by applying the second function to the second plurality of intermediate quantities corresponds to the at least one input quantity; and
  uses the at least one output quantity to respond to the request to retrieve the at least one input quantity.

26. The system of claim 25 comprising a cryptoprocessor wherein the at least one input quantity is a key and the cryptoprocessor, in operation, generates requests to retrieve the at least one input quantity.

27. The system of claim 26 wherein the wired logic, in operation, sends the at least one output quantity to the cryptoprocessor without storing the at least one output quantity in a register.

28. The system of claim 25 wherein each intermediate quantity in the first plurality of intermediate quantities is of a same size as the at least one input quantity.

29. The system of claim 25 wherein the second function takes into account the at least one selection value.

30. The system of claim 25 wherein the at least one register comprises a first register and a second register and the at least one selection value comprises a selection bit, and wherein the first function determines whether the at least one input quantity is to be stored in the first register or the second register depending on the selection bit.

31. The system of claim 30 wherein the first function determines, depending on the selection bit, whether:
the at least one input quantity is to be stored in the first register and the ones' complement of the at least one input quantity is to be stored in the second register; or
the at least one input quantity is to be stored in the second register and the ones' complement of the at least one input quantity is to be stored in the first register.

32. The system of claim 30 wherein the first and second functions are such that, if the second plurality of intermediate quantities is the same as the first plurality of intermediate quantities, the at least one output quantity is the same as the at least one input quantity.

* * * * *